Sept. 12, 1967 R. G. PIETY 3,341,811
ACOUSTICAL SIGNAL GENERATING
Filed Sept. 12, 1966 2 Sheets-Sheet 1

INVENTOR
R. G. PIETY
BY Young & Quigg
ATTORNEYS

United States Patent Office 3,341,811
Patented Sept. 12, 1967

3,341,811
ACOUSTICAL SIGNAL GENERATING
Raymond G. Piety, Bartlesville, Okla., assignor to Phillips Petroleum Company, a corporation of Delaware
Filed Sept. 12, 1966, Ser. No. 578,574
4 Claims. (Cl. 340—17)

ABSTRACT OF THE DISCLOSURE

An acoustical signal generating device in the form of a multisided prism, having a coil shaped to conform with the inner surface of the prism, the axis of the coil being parallel to the faces of the prism and substantially perpendicular to the direction of propagation of the generated signals.

---

Figure 1:
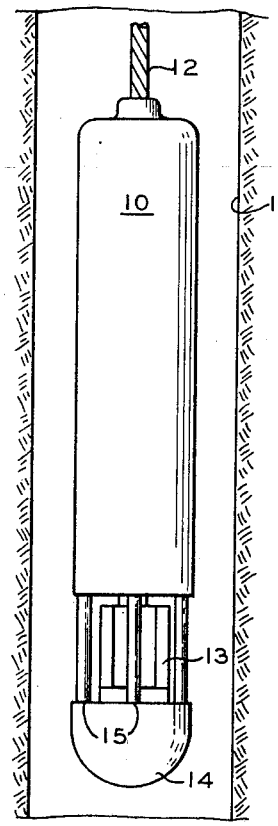

This invention relates to acoustical signal generating. In one of its aspects it relates to an acoustical signal generator shaped in the form of a prism having a plurality of sides and due to electromagnetic force is adapted to generate strong acoustical signals in a plurality of directions.

A knowledge of the velocity of propagation of acoustical waves in earth formations is valuable in analyzing oil producing regions penetrated by wells and in making seismic surveys. These velocities can be measured by lowering an acoustical signal generator and one or more detectors into a well to make measurements at various depths. Signal generators for use in this manner should be capable of establishing sharply defined acoustical signals repetitively in order that a plurality of measurements can be made in a given well.

A device for generating acoustical signals in a well for the purpose of making seismic surveys is disclosed and claimed in application Ser. No. 216,566, filed Aug. 13, 1962, now Patent No. 3,258,741. In that application an acoustical signal is generated by rapidly flexing a diaphragm which has one side thereof positioned in contact with a liquid so as to transmit a compressional wave through the liquid. This flexure is accomplished by positioning two coils adjacent one another on the side of the diaphragm remote from the liquid. A large current pulse is transmitted through the two coils, which are positioned so that the resulting magnetic field established about the coils oppose one another. This results in the rapid movement of the two coils away from one another so that the one adjacent the diaphragm displaces a diaphragm into the liquid. By the use of two diaphragms disposed adjacent the two coils, the generator can develop acoustical signals in opposite directions.

Heretofore when it is desirable to generate acoustical signals in all directions, a layer of copper wire in the form of a coil was surrounded with a cylinder of magnetic sheet metal such as nickel or low carbon steel. A charged condensor was discharged through the copper coil and the cylinder expanded because of the electromagnetic inner action of the induced current in the cylinder and the current of the coil. The impulse given the cylinder generates an impulsive wave in a fluid medium, for example, in a bore hole. As is understood by one skilled in the art, the generation of the wavelet is due to the expansion of the cylinder throughout its circumference.

I have now discovered that a stronger wavelet can be generated from a given diameter cylinder using a multi-sided prism having an internal coil conforming thereto. The sides of the prism will vibrate outwardly and inwardly as the coil is charged and discharged. Thus, the prism, being made of a suitable thin gauge metal, need not expand throughout its total circumference but generates the acoustical signals due to the flexing of each side.

By various aspects of this invention, one or more of the following, or other, objects can be obtained.

It is an object of this invention to provide an apparatus for generating strong seismic signals in many directions simultaneously.

It is a still further object of this invention to provide a novel acoustical signal generator.

It is a further object of this invention to provide a method and apparatus for generating acoustical signals in liquids wherein a strong signal is generated in many directions.

It is yet another object of this invention to provide a method and apparatus for generating acoustical signals in bore holes.

Other aspects, objects, and the several advantages of this invention are apparent to one skilled in the art from a study of this disclosure, the drawings, and the appended claims.

According to the invention, there is provided an acoustical signal generator having an outer metallic casing shaped in the form of a multi-sided prism. The prism can have three or more sides, and is enclosed at the top and bottom. Disposed within the prism casing is a spirally wound coil shaped like the prism. In one embodiment a suitable means is provided for maintaining a fluid between the casing and the coil so that as the casing sides flex, the space between the coil and the casing can readily adjust to the change in volume.

Figure 2:
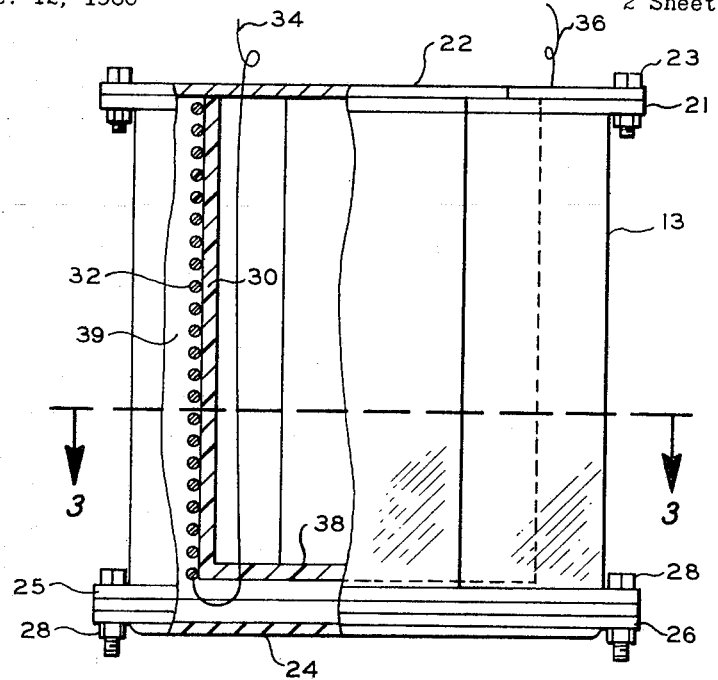
Figure 3:
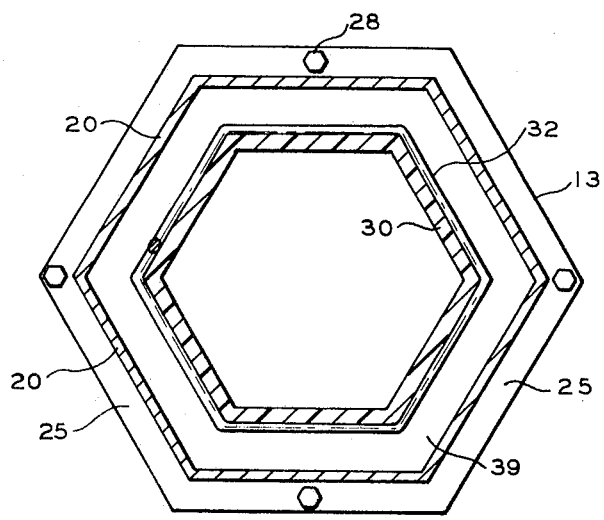

The prism casing has enough sides which are preferably identical, so that the acoustical wavelet will tend to be generated in all directions in a given plane. Further, the prism casing will not have so many sides that the wavelets are generated due to expansion throughout the circumference of the casing but will be generated due to flexing of the individual sides. The prism casing will preferably have from five to seven equal sides, optimumly, six equal sides. The invention will now be described with reference to the accompanying drawings in which FIGURE 1 is a schematic representation of the signal generator of this invention disposed in a bore hole; FIGURE 2 is a detailed view shown partially in section of the signal generator of FIGURE 1; FIGURE 3 is a view taken along line 3—3 of FIGURE 2; and FIGURE 4 is a schematic circuit drawing of the electrical components associated with the signal generator of this invention.

Referring now to the drawings in detail and to FIGURE 1 in particular, there is shown a casing 10 which is suspended within a bore hole 11 by means of a cable 12. An acoustical signal generator 13 is suspended beneath casing 10, and a weight 14 is suspended beneath generator 13 by a plurality of rods 15. This weight aids in lowering the casing into the bore hole and protects the signal generator.

Signal generator 13 is illustrated in detail in FIGURES 2 and 3. A prismatic metal casing having six equal sides 20 has end flanges 21 and 25. The casing is enclosed in the top portion by a metal plate 22 and in the bottom portion by a rubber diaphragm 24. Plate 22 is bolted to flange 21 by bolts 23 and diaphragm 24 is attached to the bottom portion of the casing by annular ring 26 and bolts 28. The casing is preferably made out of relatively thin gauge metal, preferably copper or aluminum. The casing can be made in one piece or in a plurality of pieces. Disposed within the prismatic casing is a core 30 which is hexagonally shaped in the cross section. The core which has bottom 38 and can be attached to top plate 22 is preferably made out of a non-conducting material such as polyethylene, polypropylene, and the like. The core need not be hollow as shown but can be solid. Wound tightly around core 30 is a coil 32 having leads 34 and 36 leading through plate 22 and to a suitable electrical circuit which will be hereinafter described. Coil 32 is positioned as close as possible without touching the sides 20 of the prismatic casing. There will remain however a space 39 between coils 32 and sides 20. As sides 20 flex outwardly, this space will vary. A compressible fluid such as air is maintained in space 39 and between diaphragm 24 and plate 38. Thus, as sides 20 go outwardly thereby increasing space 39, the air will fill up the newly created volume. The flexibility of diaphragm 20 allows equalization of the pressure as the wave generator is lowered into a fluid filled bore hole. The compressed air allows the sides 20 of the hexagonal cylinder to move more freely than would be the case with a non-compressible fluid such as water.

Figure 4:
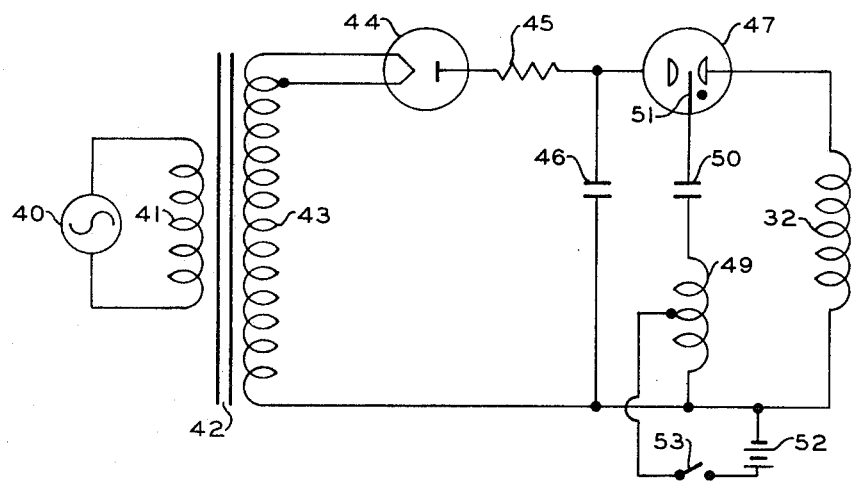

A suitable circuit for energizing the signal generator is illustrated schematically in FIGURE 4. An alternating current source 40 which can be at the surface is connected across the primary winding 41 of a step-up transformer 42. The first end terminal of the secondary coil 43 of transformer 42 is connected to one terminal of the heater-cathode of rectifier 44. The second terminal of this cathode is connected through a few turns of winding 43 near the first end terminal. The anode of rectifier 44 is connected through a resistor 45 to the first terminal of a capacitor 46. The second terminal of capacitor 46 is connected to the second end terminal of transformer winding 43. The first terminal of capacitor 46 is connected through a spark gap switch 47 to the first terminal of coil 32. The second terminal of capacitor 46 is connected to the second terminal of coil 32. The coil 49 of an autotransformer is connected between the second terminal of capacitor 46 and the first terminal of capacitor 50. The second terminal of capacitor 50 is connected to a probe 51 which extends into the spark gap switch 47. A battery or other suitable direct current source 52 and a switch 53 are connected in series between one end terminal of coil 49 and intermediate point thereon.

In the operation of the circuit illustrated in FIGURE 4, switch 53 which can be positioned at the surface is initially open. Rectifier 44 conducts to charge capacitor 46. When it is desired to actuate the signal generator, switch 53 is closed so that a current pulse flows into the lower portion of coil 49. This induces a relatively high voltage in the secondary of the coil which transmits a spark to switch 47 via condensor 50. This high voltage spark causes the switch 47 to conduct so that capacitor 46 is discharged through coil 32. It is desirable that transformer 42 be of such configuration as to establish a large output voltage and that capacitor 46 be quite large so that a substantial amount of energy is stored therein. A current flow of several thousand amperes through the coil for a short period of time is desired to produce rapid flexure of sides 20. When the current is discharged through coil 32, the resulting magnetic currents which are set up perpendicular to the coil will cause sides 20 to flex or bow outwardly and then inwardly as the surge of the current dies down. The juncture of sides 20 serves as nodal points for the bowing sides.

In well logging operations, it is generally desirable to position transformer 42 and the associated circuit elements within casing 10. Alternating current source 40 can be located at the surface with connecting leads passing through cable 12. Of course, a portable power supply can be mounted in casing 10 if necessary. Switch 53 can be operated periodically by means of a timer down hole, not shown, which can be contained within casing 10 or connected to the mechanism which lowers the casing into the well such that the switch is operated each time the casing is lowered by a given amount. If desired, switch 53 can be located at the surface with connecting wires passing through cable 12.

The signals so generated as above described can be sensed and recorded by any suitable sensing and recording device such as that disclosed and claimed in copending application Ser. No. 294,698.

The size of the prismatic generating device can vary over a large amount. However, the device must have a small enough diameter to fit in a bore hole which is about 6 inches. The length of the sides of the prismatic generating means can be in the order of 6 to 12 inches to obtain adequate wave form resolution.

Whereas the invention has been described as employing a cylindrically wound coil, it is within the scope of the invention to employ other shapes for coil 32. For example, a toroidally wound coil could be used or an irregularly shaped coil could be used. It is sufficient that the coil substantially conform to the shape of the signal generator 13.

Reasonable variation and modification are possible within the scope of the foregoing disclosure, the drawings, and the claims to the invention without departing from the spirit thereof.

I claim:
1. An acoustical signal generating device comprising:
 (a) an enclosed poly-sided prism shaped metal casing,
 (b) a coil, shaped to conform with the inner surface of said prism and positioned within said metal casing, the axis of said coil being substantially parallel to the axis of said prism, and
 (c) means to transmit a pulsed current through said coil such that a force is transmitted to the sides of said casing to cause said casing sides to periodically bow outwardly, the juncture of said sides serving as nodal points for said bowing sides, thus sending a compressional wave out perpendicular to the said sides of said casing and substantially perpendicular to the axis of said coil.

2. A generating device according to claim 1 wherein said prism shaped metal casing has six sides.

3. An acoustical signal generating device according to claim 1 wherein there is a compressible fluid disposed between said coil and said casing, and there is further provided a means for maintaining an expandable supply of compressible fluid between said coil and said casing.

4. An acoustical signal generating device according to claim 1 wherein said means for transmitting current comprises a step-up transformer, an alternating current source supplied to the primary winding of said transformer, a rectifier and a first capacitor connected in series with the secondary winding of said transformer, a spark gap switch having two spaced electrodes and a spark probe, means connecting the electrodes of said spark switch in series with said coil across said first capacitor, a second capacitor, an autotransformer connected through said second capacitor to the probe of said spark switch, a voltage source, and switching means connecting said voltage source across a portion of said autotransformer so that closure of the switching means supplies current to said portion of said autotransformer to generate a spark at said probe, thereby establishing conduction through said spark switch so as to discharge said capacitor through said coil.

References Cited

UNITED STATES PATENTS 2,064,911  12/1936  Hayes _____ 340—9
3,258,741  6/1966  Clark _____ 340—17

BENJAMIN A. BORCHELT, *Primary Examiner.*

P. A. SHANLEY, *Assistant Examiner.*